(12) United States Patent
Cai et al.

(10) Patent No.: US 11,410,687 B1
(45) Date of Patent: Aug. 9, 2022

(54) WRITE EFFICIENCY MANAGEMENT FOR TAPE CARTRIDGE WRITING

(71) Applicant: Meta Platforms, Inc., Menlo Park, CA (US)

(72) Inventors: Yu Cai, Palo Alto, CA (US); Chengyan Fu, Seattle, WA (US); Haoci Zhang, Seattle, WA (US); John Mah, Westminster, CO (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/463,380

(22) Filed: Aug. 31, 2021

Related U.S. Application Data

(63) Continuation of application No. 17/118,341, filed on Dec. 10, 2020, now Pat. No. 11,138,993, which is a continuation of application No. 16/750,980, filed on Jan. 23, 2020, now Pat. No. 10,910,002.

(51) Int. Cl.
  *G11B 5/584* (2006.01)
  *G11B 5/008* (2006.01)
  *G11B 5/55* (2006.01)

(52) U.S. Cl.
  CPC ........ *G11B 5/00817* (2013.01); *G11B 5/5508* (2013.01)

(58) Field of Classification Search
  CPC ............ G11B 5/00817; G11B 5/00813; G11B 5/5508; G11B 27/36; G11B 5/54; G11B 15/04; G11B 19/04; G11B 19/02; G11B 5/00; G11B 5/09; G11B 20/12
  USPC ..................................................... 360/31, 75
  See application file for complete search history.

(56) References Cited

U.S. PATENT DOCUMENTS

| | | |
|---|---|---|
| 6,957,379 B1 | 10/2005 | Patapoutian et al. |
| 7,796,354 B2 | 9/2010 | Justo |
| 8,406,096 B1 | 3/2013 | Edling et al. |
| 9,070,390 B2 | 6/2015 | Green et al. |
| 9,099,162 B2 | 8/2015 | Alber et al. |
| 9,658,784 B1 | 5/2017 | Ahmad et al. |
| 2002/0046215 A1 | 4/2002 | Petrocelli |
| 2006/0018051 A9 | 1/2006 | Chiao et al. |
| 2013/0128371 A1* | 5/2013 | Brong ................... G11B 5/455 360/110 |

\* cited by examiner

*Primary Examiner* — Nabil Z Hindi
(74) *Attorney, Agent, or Firm* — Van Pelt, Yi & James LLP

(57) ABSTRACT

One or more write efficiency metrics are determined. The one or more write efficiency metrics are associated with a tape storage drive while the tape storage drive is operating on one or more tape storage media cartridges to write data sets to the one or more tape storage media cartridges. It is predicted whether the tape storage drive would be able to write an entire set of data sets to a current tape storage media cartridge based on the one or more write efficiency metrics. It is determined whether a different tape storage drive is to be utilized to complete writing of the entire set of data sets to the current tape storage media cartridge based on the prediction.

20 Claims, 6 Drawing Sheets

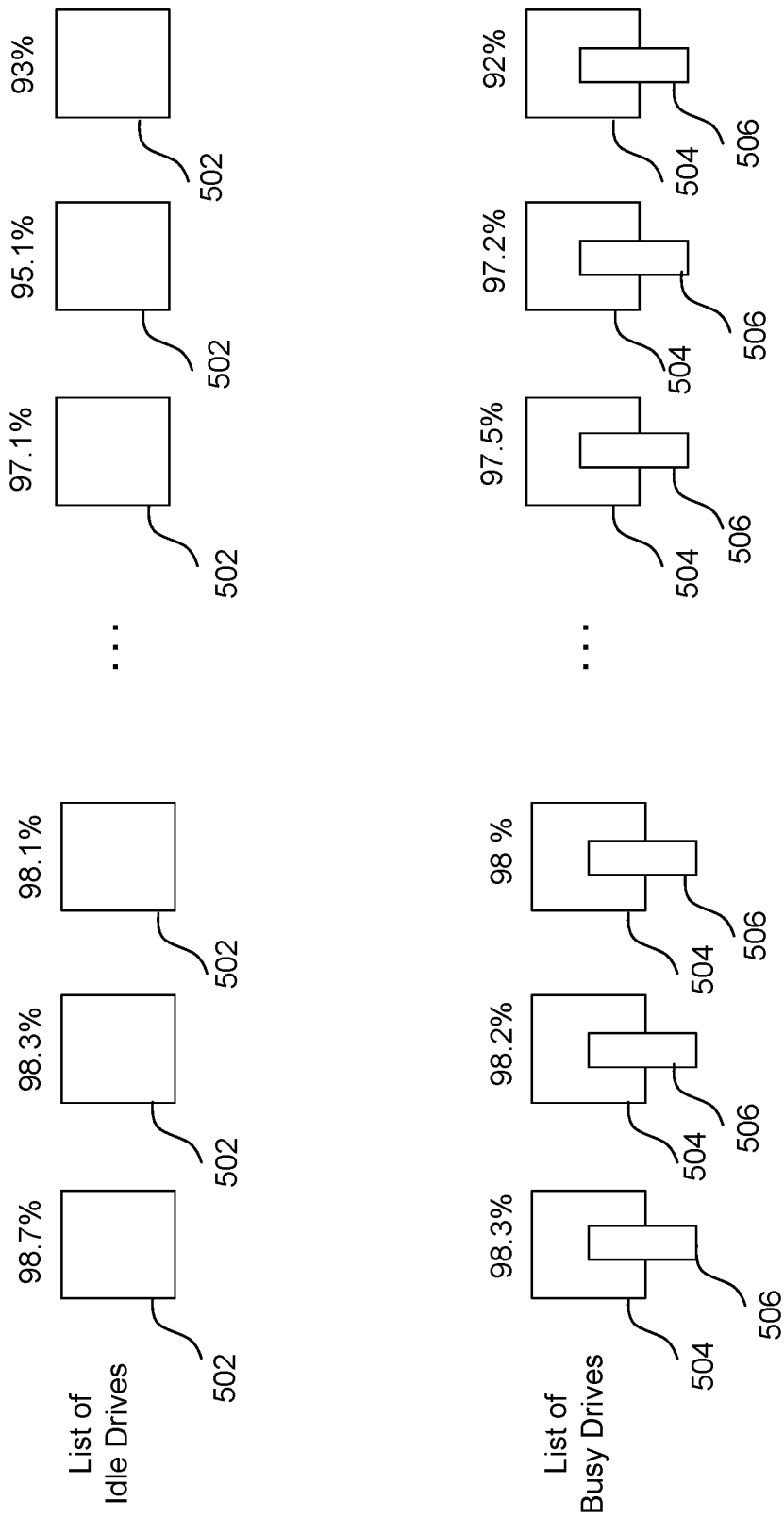

WRITE EFFICIENCY MANAGEMENT FOR TAPE CARTRIDGE WRITING

This application is a continuation of U.S. patent application Ser. No. 17/118,341 entitled WRITE EFFICIENCY MANAGEMENT FOR TAPE CARTRIDGE WRITING filed Dec. 10, 2020, which is a continuation of U.S. patent application Ser. No. 16/750,980, now U.S. Pat. No. 10,910,002, entitled WRITE EFFICIENCY MANAGEMENT FOR TAPE CARTRIDGE WRITING filed Jan. 23, 2020, both of which are incorporated herein by reference for all purposes.

BACKGROUND OF THE INVENTION

Because tape libraries are often utilized as the last tier of data backup, it is important that data is reliably stored in tape storage media. Tape libraries face a number of problems. If the tape drive has poor write quality or the tape media cartridge has too many defects, then the overall write efficiency is low and there would not be enough tape media to write all of the target amount of data (e.g., 9 TB of data). The whole write operation would need to be aborted and the 9 TB of data rewritten using a new drive or a new cartridge, which would cause a significant amount of delay.

In addition, if some of the tape drives in the tape library are degraded drives, then overprovisioning of the tape drives is necessary since the system needs to reserve some number of idle drives to enable the switching from a poorly performing drive to one of the idle drives. Otherwise, the system may not be able to find another drive that satisfies the requirements and that is able to rewrite the data. However, overprovisioning of the tape drives increases the overall cost of the system significantly.

BRIEF DESCRIPTION OF THE DRAWINGS

Various embodiments of the invention are disclosed in the following detailed description and the accompanying drawings.

FIG. 5 illustrates an example of two lists of tape drives sorted based on a write efficiency metric associated with each of the drives.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
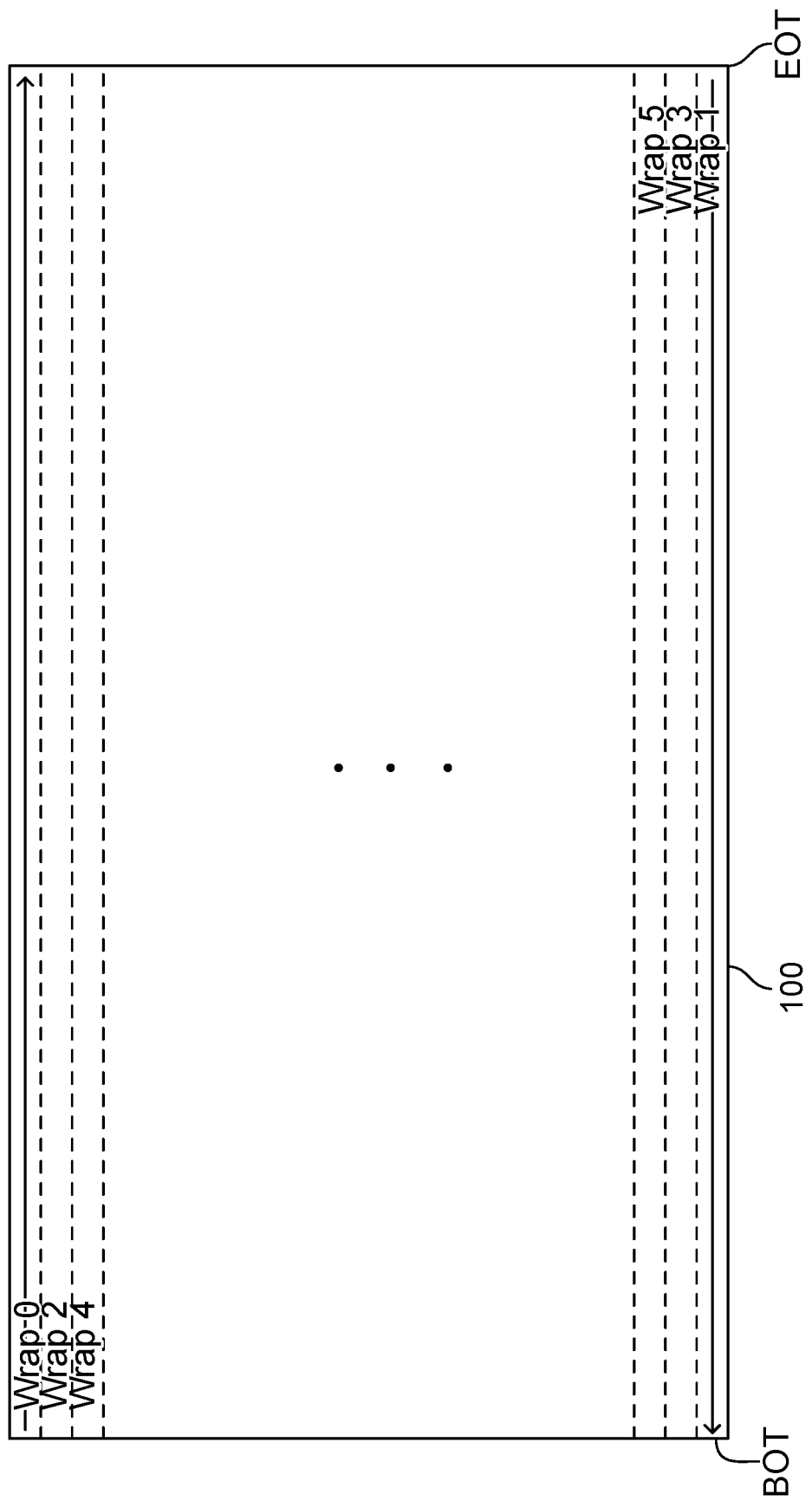
FIG. 1 illustrates an example layout of a tape media 100 that includes a plurality of wraps.

FIG. 1 illustrates an example layout of a tape media 100 that includes a plurality of wraps. Linear Tape-Open (LTO) is a high-capacity, single-reel tape storage solution. As shown in FIG. 1, the LTO format allocates unique locations for the wraps. For example, each tape media cartridge may include 164 or 168 wraps. During a write operation, the magnetic head is set to follow the location of a wrap in a direction from BOT (beginning of tape) to EOT (end of tape) in order to simultaneously write 32 parallel tracks. Once the head reaches EOT, the actuator sends the magnetic head to the next wrap location to write a set of another 32 parallel data tracks in a reverse direction from EOT to BOT. In some embodiments, data is first written to wrap 0 first, and then data is written to wraps 1, 2, 3, and so on.

The length of the tape required for writing a certain amount of data depends on the quantity of physical defects on the tape and the tape drive write head's write quality. The more physical defects on the tape, the longer the length required for writing the fixed amount of data. The reason is that the tape drive will avoid writing data to a bad portion of a wrap with many defects. When the tape drive encounters a bad region of a wrap, the tape drive write head will not write data to the bad region; instead, it will skip through the bad region and append data in the good regions following the bad region. Similarly, the worse the tape drive write head's write quality, the longer the length required for writing the fixed amount of data.

Figure 2:
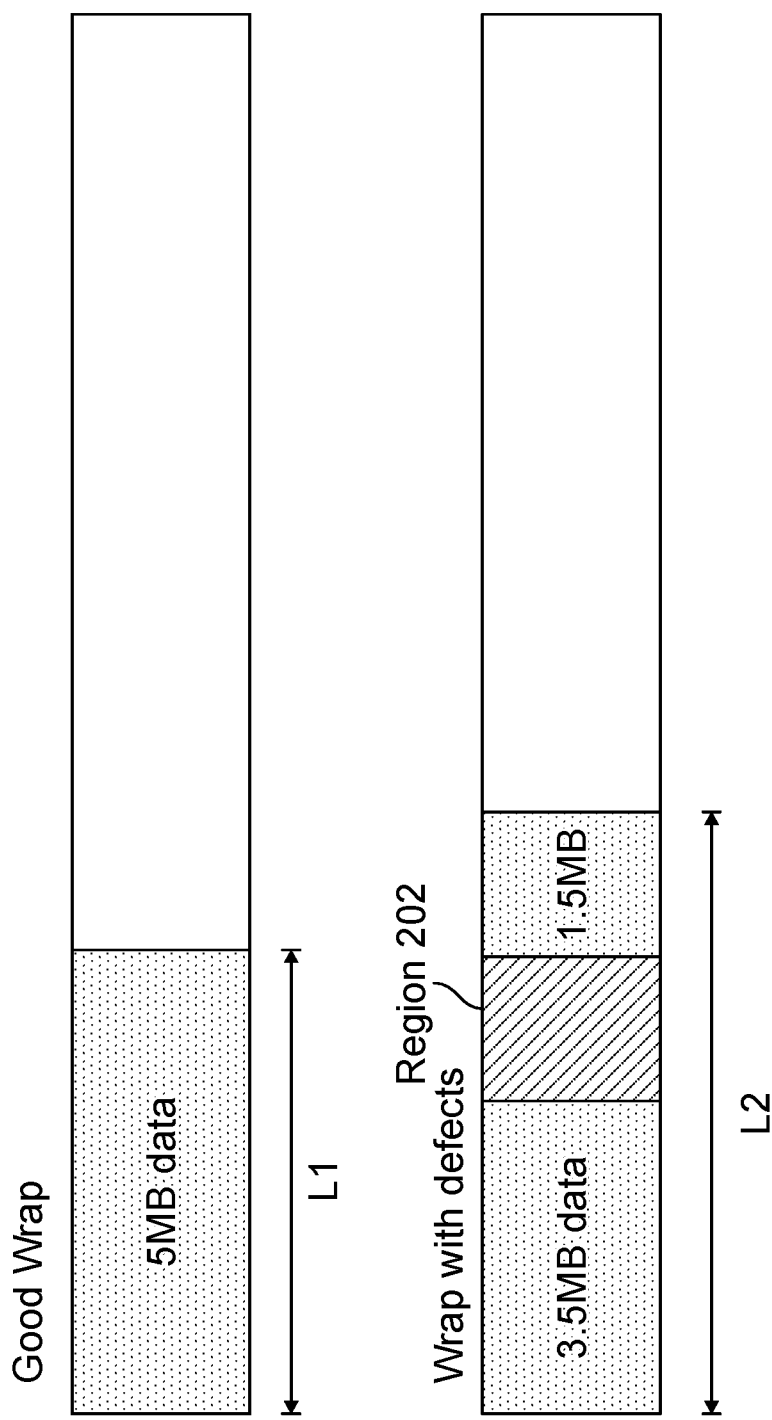
FIG. 2 illustrates that the length of the tape required for writing a certain amount of data depends on the quantity of physical defects on the tape and the tape drive write head's write quality.

FIG. 2 illustrates that the length of the tape required for writing a certain amount of data depends on the quantity of physical defects on the tape and the tape drive write head's write quality. As shown in FIG. 2, if an x megabytes (e.g., 5 MB) data unit is written to a physical portion of the wrap that has no defects, then the data block will cross L1 meters. However, if the x megabytes of unit data block is written to a physical portion of the wrap with many defects (see the shaded region 202), then the data block will span over L2 meters, where L2 is larger than L1, as some of the bad physical area on the tape will not be written to and be skipped over.

In some embodiments, the data unit to be stored to a tape media is called a data set (DS). Data sets are written onto a wrap one by one sequentially. In some embodiments, a tape media cartridge may store 9 terabytes (TB) of data, and each data set is 5 MB in size. Therefore, a tape media cartridge that has 164 wraps may include about 11.5 k of data sets in each wrap.

Figure 3:
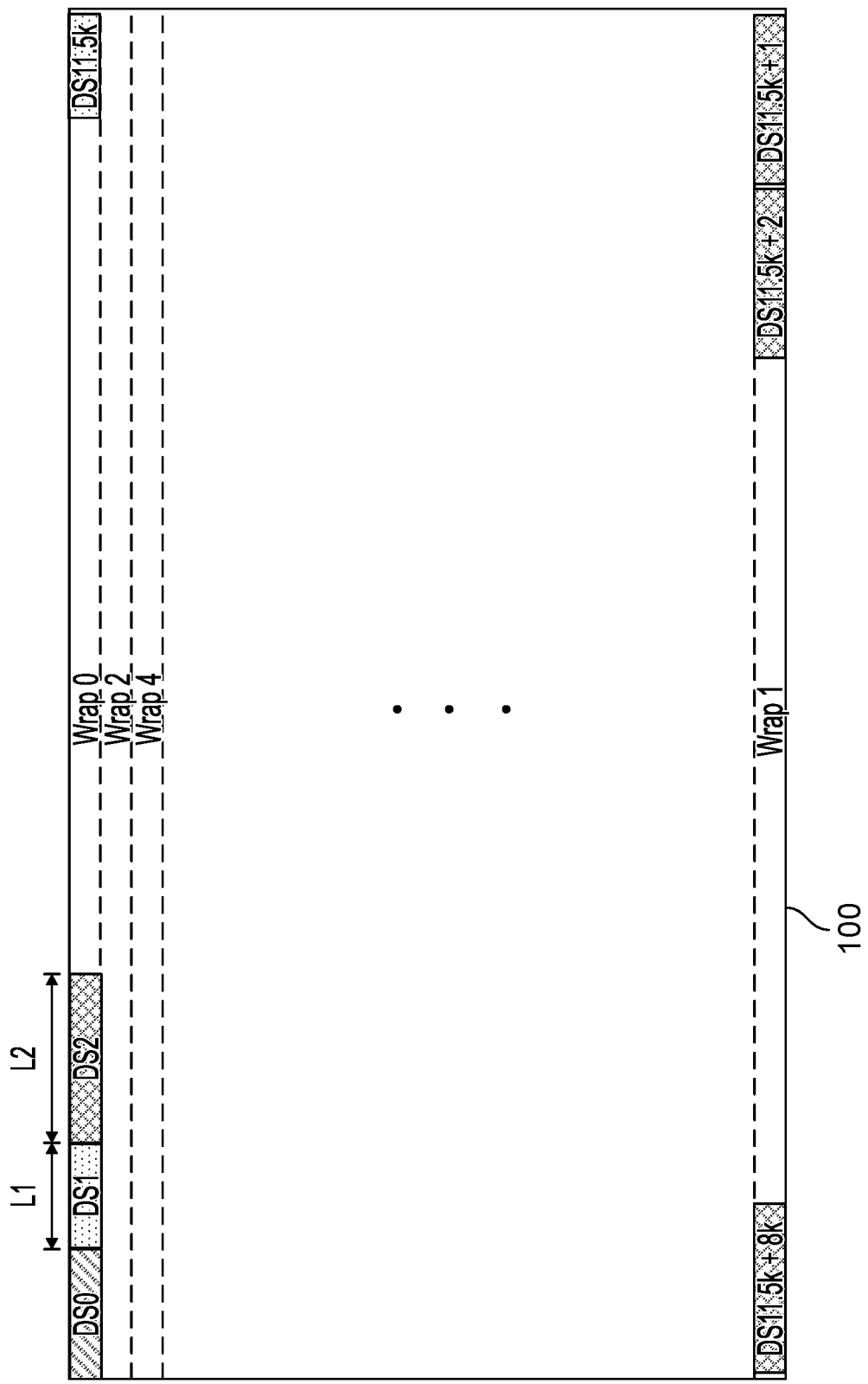
FIG. 3 illustrates that the number of data sets that may be written to a tape media cartridge depends on the quantity of physical defects on the tape and the tape drive write head's write quality.

FIG. 3 illustrates that the number of data sets that may be written to a tape media cartridge depends on the quantity of physical defects on the tape and the tape drive write head's write quality. As shown in FIG. 3, when a tape drive with good write quality is used to write data to the portions of the wrap that have very few defects, the data set will span a shorter length of the wrap. For example, data set DS1 in wrap 0 crosses L1 meters. When the tape drive is used to write data to the portions of the wrap that have many defects, the data set will span a longer length of the wrap. For example, data set DS2 in wrap 0 crosses L2 meters. On average, 11,500 data sets may be written onto a wrap. However, if a tape drive with poor write quality is used to write data to the portions of the wrap with many defects (e.g., wrap 1), then fewer number of data sets (e.g., 8,000) may be written onto the wrap.

A write service may be remotely created to continuously write 9 TB of data onto a tape media cartridge. If the tape drive has poor write quality or the tape media cartridge has too many defects, then the overall write efficiency is low and there will not be enough tape media to write all 9 TB of data. The whole write operation would need to be aborted and the 9 TB would have to be rewritten using a new drive or a new cartridge. Since writing 9 TB of data onto the tape media cartridge may take about nine hours, rewriting the data would result in nine hours of wasted time.

Another problem is that rewriting the data to a different drive means more drives are needed, which significantly increases the overall cost of the system. If some of the drives in the tape library are degraded drives, overprovisioning of the tape drives is necessary in order to reserve some number of idle drives to enable the switching from a poorly performing drive to an idle drive; otherwise, the system may not be able to find another drive that satisfies the requirements and that is able to rewrite the data. However, overprovisioning of the tape drives increases the overall cost of the system significantly. For example, a tape library may have 66 drives that costs about $3,000 each, and the total cost of the drives is about $200,000. A 9 TB tape cartridge is about $30, and 8,000 cartridges would cost about $240,000. The cost of the drives is then comparable to the cost of the tape storage media cartridges. Therefore, improved techniques of writing data to the tape drives in the tape library would be desirable.

Figure 4:
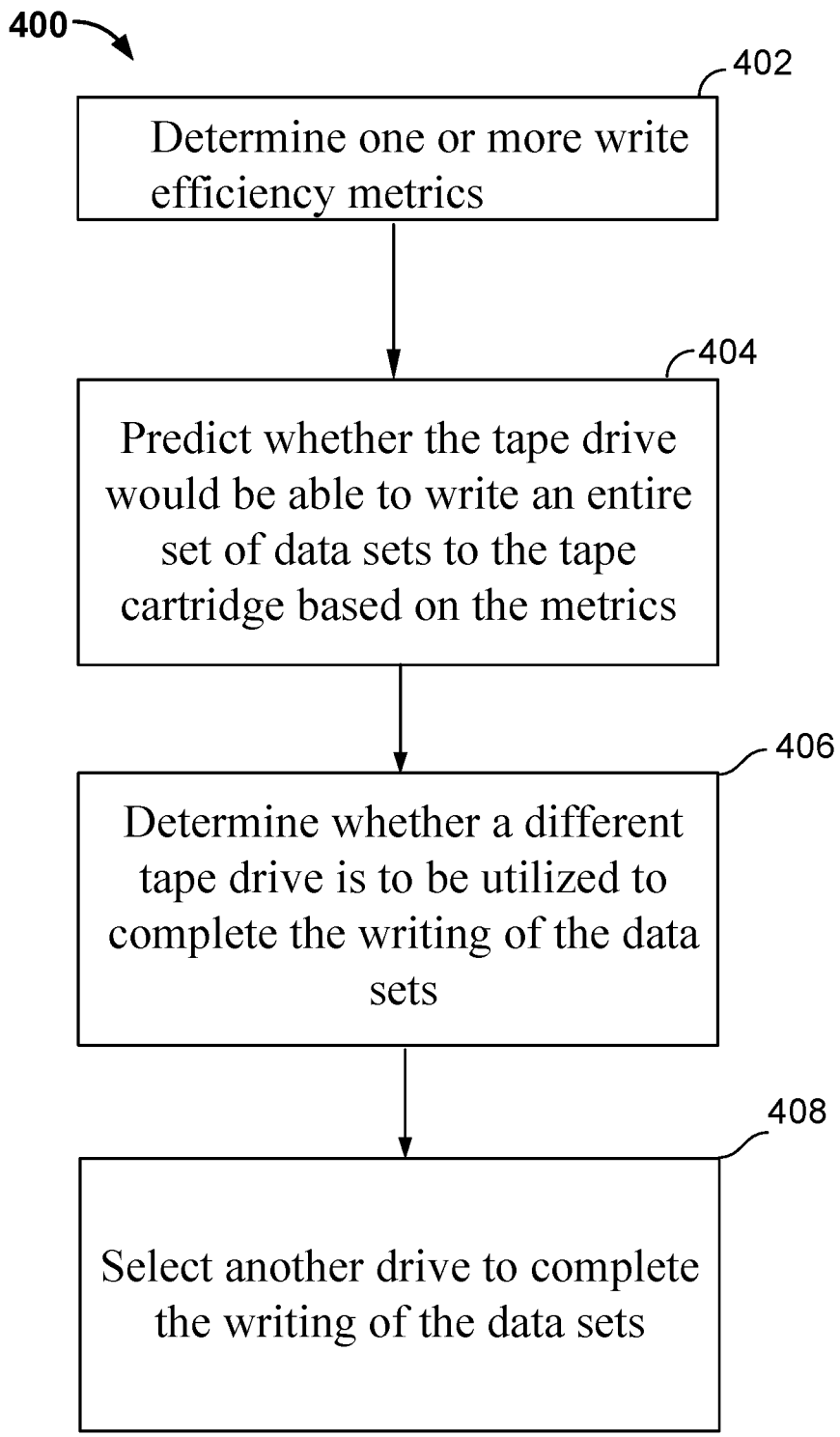
FIG. 4 illustrates an embodiment of a process 400 for writing data to a tape media cartridge by one or more tape drives.

FIG. 4 illustrates an embodiment of a process 400 for writing data to a tape media cartridge by one or more tape drives.

At 402, one or more write efficiency metrics associated with a tape storage drive while the tape storage drive is operating on one or more tape storage media cartridges to write data sets to the tape storage media cartridges are determined. A write efficiency metric indicates a quality of being able to write data sets to the tape storage media successfully without wasting time or tape storage media space. In the present application, a write efficiency metric may be referred to as a write efficiency, and the two terms may be used interchangeably.

In some embodiments, one of the write efficiency metrics includes a write efficiency metric that is a measure of the efficiency while writing the data between two data sets. For example, the write efficiency is a measure of the efficiency while writing the data between the current data set and another data set that was written earlier. This write efficiency measures the efficiency within a predetermined or limited window into the past. Different techniques may be used to determine such a write efficiency. The write efficiency may be referred to as an instant write efficiency.

In some embodiments, one of the write efficiency metrics includes a write efficiency metric that is an overall measure of the efficiency of writing data from the beginning of the tape cartridge up to a certain data set on the tape cartridge. This write efficiency may be referred to as an overall write efficiency.

In some embodiments, the instant write efficiency and the overall write efficiency may be based on a plurality of measurements.

The first measurement is the number of data sets that have already been written onto the tape:

dataSetUsed(m)=the number of already written data sets

For example, m=140638.

The second measurement is the maximum number of data sets that can be stored into the tape cartridge:

dataSetMedia(M)=The maximum number of data sets that can be stored into the tape cartridge In some embodiments, a tape media cartridge may store 9 terabytes (TB) of data, and each data set is 5 MB in size. Therefore, the tape media cartridge may include about 1.88 million data sets. For example, M=1851779.

The third measurement is the current already used tape media cartridge length, measured from the beginning of the tape cartridge:

distanceUsed(n)=the current already used tape media length, measured from the beginning of the tape For example, n=11919031 nm (nanometers) or n=11.9 km (kilometers).

The fourth measurement is the maximum length of tape media that can store the data:

distanceMedia(N)=the maximum length of tape media that can store the data

For example, N=154808737 nm or 154.8 km.

An instant write efficiency is a measure of the efficiency of writing the data between the current data set and another data set that was written earlier. For example, an instant write efficiency is the write efficiency of writing the data between the $i^{th}$ data set and the $j^{th}$ data set and can be expressed as follows:

$$\text{Instant } WE(i,j) = \left(\frac{m(j)-m(i)}{n(j)-n(i)}\right) / \left(\frac{M}{N}\right)$$

In some embodiments, the overall write efficiency is the write efficiency of writing data from the beginning of the tape cartridge up to a certain data set on the tape cartridge:

$$\text{Overall } WE = \left(\frac{m}{n}\right) / \left(\frac{M}{N}\right)$$

For example, the overall write efficiency using the example values of m, n, M, and N above is:

$$\text{Overall } WE = \left(\frac{140638}{11919031}\right)\left(\frac{1851779}{154808737}\right)$$
$$= 98.6\%$$

Here, M/N=0.01196 data sets/mm in the ideal case, which is the ideal number of logical data sets per mm. And m/n=0.011800 data sets/mm, which is the actual characteristic or the actual number of logical data sets per mm. The overall write efficiency is the ratio between the actual number of logical data sets per mm and the ideal number of logical data sets per mm, which is about 98.6%. A write efficiency metric may be a ratio between an actual amount of data written per length of a tape storage media and an ideal amount (or a maximum amount) of data written per length of the tape storage media.

In some embodiments, one of the write efficiency metrics may include a write efficiency that is calculated based on a plurality of past write efficiency values or historic write efficiency values. The write efficiency may be referred to as a historic write efficiency. For example, the write efficiency may be a moving average write efficiency. In some embodiments, the moving average write efficiency may be a scaled combination of a new write efficiency and an old write efficiency. For example, the moving average write efficiency can be determined as a*OldWriteEfficiency+(1−a)*NewWriteEfficiency, where a is a predetermined value.

In some embodiments, a historic write efficiency is maintained for each drive, and the historic write efficiency is updated periodically. For example, after a predetermined amount of data (e.g., 9 TB of data) is written by a tape drive to a tape cartridge, and if cleaning of the tape drive has not been performed during the writing of the predetermined amount of data, then the new historic write efficiency of the drive is equal to a*OldWriteEfficiency+(1−a)*NewWriteEfficiency. OldWriteEfficiency and NewWriteEfficiency may each be an overall write efficiency. This is based on the assumption that the write efficiency change is a stationary process. For example, if a=0.9, the historic write efficiency is equal to the average of the past ten write efficiency values. If there is a cleaning of the drive event during the writing of the predetermined amount of data, then the historic write efficiency of the drive is updated to be equal to the NewWriteEfficiency value after the writing of the predetermined amount of data. Since the past drive cleaning is likely to improve the write efficiency significantly, the write efficiency change is no longer a stationary process.

In some embodiments, one of the write efficiency metrics may include an average write efficiency that is based on a plurality of past instant write efficiency metrics. This write efficiency metric may be referred to as an average instant write efficiency. In some embodiments, the average instant write efficiency is the average of a plurality of (e.g., 40) past instant write efficiency values, where an instant write efficiency value is the write efficiency of writing the data between the $i^{th}$ data set and the $j^{th}$ data set. For example, each of the past instant write efficiency values spans over an interval between the $i^{th}$ data set and the $j^{th}$ data set of 5.6 GB of data, and therefore the 40 intervals span over about the past 200 GB of writing over four wraps. The average instant write efficiency is the average of the past 200 GB of writing.

Some of the write efficiency metrics may be used to sort the tape drives. In some embodiments, the tape drives may be divided into two lists. The first list includes the busy drives that are currently used for writing data. The second list includes the idle drives that are not writing data but are either idling or reading data. The two lists of drives may be sorted based on a write efficiency metric.

FIG. 5 illustrates an example of two lists of tape drives sorted based on a write efficiency metric associated with each of the drives. The first list includes the busy drives 504 that are each currently used for writing data to a corresponding tape media cartridge 506. The second list includes the idle drives 502 that are not writing data but are either idling or reading data. The two lists of drives may be sorted based on a write efficiency metric; for example, the write efficiency metric used to sort the lists of drives may be a historic write efficiency associated with a tape drive.

At 404, it is predicted whether the tape storage drive would be able to write an entire set of data sets to the tape storage media based on the one or more write efficiency metrics and determined whether a drive/cartridge write efficiency metric falls below a certain predetermined threshold. The entire set of data sets includes a planned/target amount of data that may fit into a tape cartridge, e.g., 9 TB of data. In some embodiments, at least some of the write efficiency metrics are monitored during the writing of the planned amount of data sets. At each sampling stage, the total tape media length that is required to store the total planned amount of data sets (i.e., the already written data sets plus the remaining unwritten data sets) is predicted based on the write efficiency metrics. At 406, it is determined whether a different tape storage drive is to be utilized to complete the writing of the data sets to the tape storage media based on the prediction.

A number of parameters are used or monitored:
Ltotal=the total tape media length of the tape cartridge
DStarget=target number of data sets to be written=Target amount of data (e.g., 9 TB)/data set size (e.g., 5 MB)
DScur=the current number of data sets already written into the tape cartridge
Lcur=the current tape media length being used
DStarget−DScur=the remaining number of data sets to be written
Ltotal−Lcur=the remaining tape media length Different write efficiency metrics as described above may be used to characterize the write efficiency (WE) of the current drive. In some embodiments, an average instant write efficiency is used. The average instant write efficiency may be a moving average of the past N samples of instant write efficiency. In some embodiments, the average instant write efficiency is the average of a plurality of (e.g., 40) past instant write efficiency values, where an instant write efficiency value is the write efficiency of writing the data between the $i^{th}$ data set and the $j^{th}$ data set. For example, each of the past instant write efficiency value spans over an interval between the $i^{th}$ data set and the $j^{th}$ data set of 5.6 GB of data, and therefore the 40 intervals span over about the past 200 GB of writing over four wraps. The average instant write efficiency is the average of the past 200 GB of writing.

The predicted total tape media length that is required to store the total planned amount of data sets=Lcur+(Ltotal/WE)*((DStarget−DScur)/Dtotal) Equation (1)
where Dtotal is equal to the total number or the maximum number of data sets that a cartridge can write.

If the predicted total media length is less than Ltotal−margin, where margin is a predetermined threshold (e.g., 1-2% of the total length of the cartridge), then it is determined that the current drive can safely write the remaining data into the cartridge and switching to a new drive is not performed; otherwise, it is determined that the current drive has degraded to such a level that switching to a new drive is needed. The degraded drive is hereinafter also referred to as degraded drive X, and the tape cartridge that the degraded drive has been writing to is hereinafter referred to as tape cartridge X.

In some embodiments, it is determined whether a drive/cartridge write efficiency metric falls below a certain predetermined threshold. If the metric falls below the threshold, then it is determined that a different tape storage drive is to be utilized to complete the writing of the data sets to the tape storage media. A future write efficiency metric (WEfuture) may be determined; this is an estimated minimum write efficiency value that allows all the remaining of the target data to be written onto the remaining length of the tape cartridge:

$$WEfuture=((DStarget-DScur)/(Ltotal-Lcur))/(MaxDataSets/TotalLength)$$

where

Ltotal=the total tape media length of the tape cartridge

DStarget=target number of data sets to be written=Target amount of data (e.g., 9 TB)/data set size (e.g., 5 MB)

DScur=the current number of data sets already written into the tape cartridge

Lcur=the current tape media length being used

MaxDataSets=the maximum number of data sets that can be written=Maximum amount of data (e.g., 9.3 TB)/data set size (e.g., 5 MB)

The historic write efficiency of the drive may be compared with the WEfuture. For example, the historic write efficiency should be greater than WEfuture+margin, where the margin is a predetermined threshold value, e.g., 1% or 2%. If the above relationship is no longer true, then it is determined that the current drive has degraded to such a level that switching to another drive that has better performance is necessary. The degraded drive is hereinafter also referred to as degraded drive X, and the tape cartridge that the degraded drive has been writing to is hereinafter referred to as tape cartridge X.

At 408, another drive is selected to complete the writing of the data sets to the tape storage media cartridge (tape cartridge X) based on the prediction. As described above, two lists of tape drives may be maintained. The first list includes the busy drives that are each currently used for writing data to a corresponding tape media cartridge. The second list includes the idle drives that are not writing data but are either idling or reading data. The two lists of drives may be sorted based on a write efficiency metric. For example, the write efficiency metric used to sort the lists of drives may be a historic write efficiency associated with a tape drive.

In some embodiments, the second list that includes the idle drives is searched through first to select a drive to switch to, such that the remaining data sets may be written by the selected idle drive to tape cartridge X. The selecting of a drive from the second list may be based on one or more criteria. For example, the drive with the largest write efficiency metric may be selected. The write efficiency metric value associated with the selected drive is then substituted into Equation 1 to calculate the predicted total tape media length. The predicted total tape media length is the total length required to store the total planned quantity of data sets of tape cartridge X when the selected drive is used to write the remaining data sets to tape cartridge X.

If the predicted total media length is less than Ltotal−margin, where margin is a predetermined threshold, then it is determined that the selected idle drive can safely write the remaining data into cartridge X and that switching to the selected idle drive should be performed. Tape cartridge X is removed from the previous degraded drive and moved to the selected idle drive, and writing of the remaining data sets to cartridge X may be continued. The previous degraded drive may be sent for repair. The advantage of this method is that the tape drive cleaning process is taken out of the critical data path and performed in the background. Once the degraded drive has been cleaned, it may be placed back into the idle list, waiting to be deployed at a later time.

If, however, after the second list that includes the idle drives has been searched through and none of the drives is selected based on the one or more criteria described above, then the first list that includes the busy drives that are currently used for writing data is searched through next to select one or more candidate drives to switch to, such that the remaining data sets may be written by one of the selected candidate drives to tape cartridge X.

The selecting of the one or more candidate busy drives from the first list may be based on one or more criteria. For each of the busy drives on the first list that is being considered, its associated write efficiency metric value is substituted into Equation 1 to calculate the predicted total tape media length. This predicted total tape media length is the length required to store the total planned amount of data sets of cartridge X when the busy drive currently being considered is used to write the remaining data sets to tape cartridge X.

If the predicted total media length is less than Ltotal−margin, where margin is a predetermined threshold, then it is determined that the busy drive currently being considered can safely write the remaining data into cartridge X and the busy drive currently being considered is selected as one of the candidate busy drives to switch to.

Figure 6A:
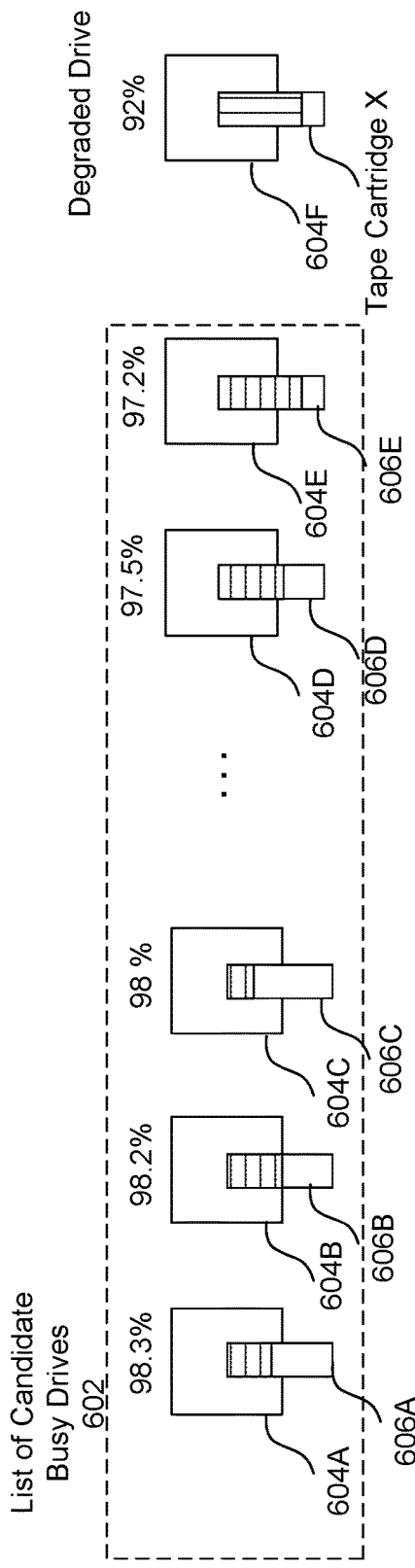
FIG. 6A illustrates a resulting list 602 of candidate busy drives (604A, 604B, 604C, 604D, and 604E) that may swap their cartridges (606A, 606B, 606C, 606D, and 606E) with the degraded drive 604F that has been writing data to tape cartridge X.
Figure 6B:
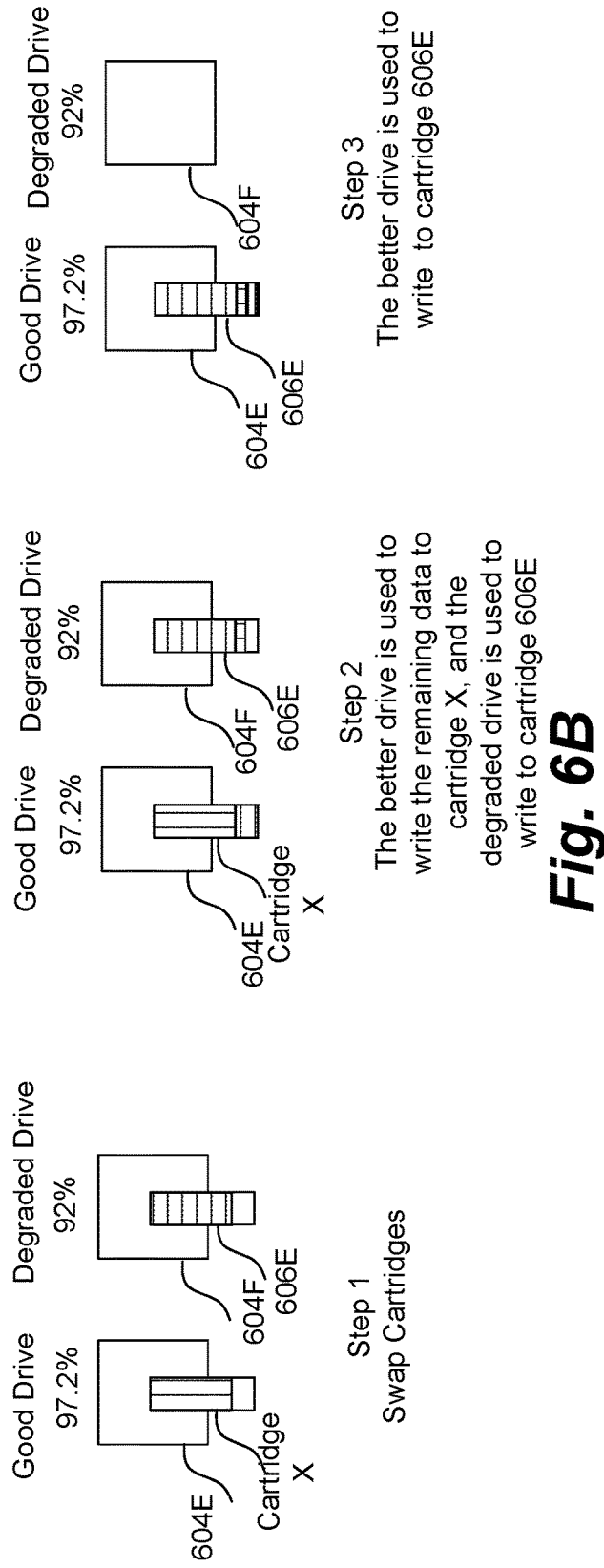
FIG. 6B illustrates the steps of switching the writing of tape cartridge X from the degraded drive to another busy drive.

FIG. 6A illustrates a resulting list 602 of candidate busy drives (604A, 604B, 604C, 604D, and 604E) that may swap their cartridges (606A, 606B, 606C, 606D, and 606E) with the degraded drive 604F that has been writing data to tape cartridge X. FIG. 6B illustrates the steps of switching the writing of data to tape cartridge X from the degraded drive to another busy drive.

One of the drives on the resulting list 602 of candidate busy drives is selected for swapping cartridges with the degraded drive 604F based on one or more criteria. In some embodiments, the drive to select is based on the amount of remaining data that the drive needs to write to its current tape cartridge. For example, if a candidate busy drive has less remaining data to write to its own current cartridge, then that drive is selected for swapping cartridges with the degraded drive 604F. In other words, a candidate busy drive that is expected to finish writing to its current tape cartridge the earliest is preferred over other candidate busy drives.

As shown in FIG. 6A, the good busy drive 604E has the least amount of remaining data to write. Therefore, as shown in step 1 of FIG. 6B, the good busy drive 604E is selected to swap cartridges with the degraded drive 604F: the cartridge previously serviced by the degraded drive 604F (i.e., tape cartridge X) is removed from the degraded drive 604F and moved to the selected busy drive 604E, and the cartridge previously serviced by the good busy drive 604E (i.e., tape cartridge 606E) is removed from the good busy drive 604E and moved to the degraded drive 604F.

As shown in step 2 of FIG. 6B, the selected busy drive 604E is used to write cartridge X's remaining data to cartridge X. Similarly, the degraded drive 604F is used to write tape cartridge 606E's remaining data to cartridge 606E.

As shown in step 3 of FIG. 6B, if the selected busy drive 604E has finished writing to cartridge X but the degraded drive 604F has not finished writing to tape cartridge 606E, then the tape cartridge 606E is moved back to the selected busy 604E for further writing.

However, if after the first list that includes the busy drives has been searched through and none of the drives are selected based on the above described one or more criteria, then a plurality of the busy drives on the first list is selected to swap cartridges with the degraded drive in a round-robin technique. The writing of tape cartridge X's remaining data to tape cartridge X is performed by the plurality of selected drives in a round-robin fashion, such that the average write efficiency metric of the degraded drive and the plurality of selected drives is above a predetermined threshold. In one example, the write efficiency metric corresponding to the degraded drive is 92% and the write efficiency metrics corresponding to two other selected busy drives are both 97%. The average write efficiency value is about 95.3%, which is acceptable.

If the round-robin technique described above also fails, then tape cartridge X is removed from the degraded drive such that the degraded drive may be sent for repair. The writing of the remaining data sets to tape cartridge X may be suspended until a good drive becomes available and the writing of the data sets to tape cartridge X may be continued and completed by the good drive.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor; and
   a memory coupled with the processor, wherein the memory is configured to provide the processor with instructions which when executed cause the processor to:
   determine one or more write efficiency metrics associated with a tape storage drive while the tape storage drive is operating on one or more tape storage media cartridges to write data sets to the one or more tape storage media cartridges, wherein a write efficiency metric comprises a ratio between an actual amount of data written per length of a tape storage media cartridge and a maximum amount of data written per length of the tape storage media cartridge;
   predict whether the tape storage drive would be able to write an entire set of data sets to a current tape storage media cartridge based on the one or more write efficiency metrics; and
   determine whether a different tape storage drive is to be utilized to complete writing of the entire set of data sets to the current tape storage media cartridge based on the prediction.

2. The system of claim 1, wherein predicting whether the tape storage drive would be able to write an entire set of data sets to a current tape storage media cartridge based on the one or more write efficiency metrics further comprises:
   determining a predicted total tape media length that is required to store the entire set of data sets based on the one or more write efficiency metrics.

3. The system of claim 2, wherein predicting whether the tape storage drive would be able to write an entire set of data sets to a current tape storage media cartridge based on the one or more write efficiency metrics further comprises:
   determining whether the predicted total tape media length is less than a total tape media length of the current tape storage media cartridge minus a predetermined margin.

4. The system of claim 1, wherein the memory is configured to provide the processor with instructions which when executed cause the processor to:
   maintain two lists of tape storage drives, wherein a first list comprises a plurality of busy tape storage drives that are currently used for writing data, and wherein a second list comprises a plurality of idle tape storage drives that are not writing data but are either idling or reading data.

5. The system of claim 4, wherein the memory is configured to provide the processor with instructions which when executed cause the processor to:
   sort the two lists of tape storage drives based on a write efficiency metric.

6. The system of claim 4, wherein the memory is configured to provide the processor with instructions which when executed cause the processor to:
   select a different tape storage drive to be utilized to complete writing of the entire set of data sets to the current tape storage media cartridge, wherein the selected different tape storage drive is selected from the second list comprising the plurality of idle tape storage drives, and wherein the selected different tape storage drive has an associated write efficiency metric that is largest among the plurality of idle tape storage drives, and wherein the associated write efficiency metric is used to calculate a predicted total media length that is required to store the entire set of data sets, and wherein the predicted total media length is less than a total tape media length of the current tape storage media cartridge minus a predetermined margin.

7. The system of claim 1, wherein the memory is configured to provide the processor with instructions which when executed cause the processor to:
   in response to determining that a different tape storage drive is to be utilized to complete writing of the entire set of data sets to the current tape storage media cartridge, use the different tape storage drive to complete writing of the entire set of data sets to the current tape storage media cartridge.

8. A system, comprising:
   a processor; and
   a memory coupled with the processor, wherein the memory is configured to provide the processor with instructions which when executed cause the processor to:
   determine one or more write efficiency metrics associated with a tape storage drive while the tape storage drive is operating on one or more tape storage media cartridges to write data sets to the one or more tape storage media cartridges, wherein one of the one or more write efficiency metrics comprises an instant write efficiency metric that is a measure of efficiency while writing data between a current data set and another data set that was written earlier;
   predict whether the tape storage drive would be able to write an entire set of data sets to a current tape storage media cartridge based on the one or more write efficiency metrics; and
   determine whether a different tape storage drive is to be utilized to complete writing of the entire set of data sets to the current tape storage media cartridge based on the prediction.

9. The system of claim 8, wherein predicting whether the tape storage drive would be able to write an entire set of data sets to a current tape storage media cartridge based on the one or more write efficiency metrics further comprises:
   determining a predicted total tape media length that is required to store the entire set of data sets based on the one or more write efficiency metrics.

10. The system of claim 9, wherein predicting whether the tape storage drive would be able to write an entire set of data sets to a current tape storage media cartridge based on the one or more write efficiency metrics further comprises:
   determining whether the predicted total tape media length is less than a total tape media length of the current tape storage media cartridge minus a predetermined margin.

11. The system of claim 8, wherein the memory is configured to provide the processor with instructions which when executed cause the processor to:
   maintain two lists of tape storage drives, wherein a first list comprises a plurality of busy tape storage drives that are currently used for writing data, and wherein a second list comprises a plurality of idle tape storage drives that are not writing data but are either idling or reading data.

12. The system of claim 11, wherein the memory is configured to provide the processor with instructions which when executed cause the processor to:
   sort the two lists of tape storage drives based on a write efficiency metric.

13. The system of claim 11, wherein the memory is configured to provide the processor with instructions which when executed cause the processor to:
   select a different tape storage drive to be utilized to complete writing of the entire set of data sets to the current tape storage media cartridge, wherein the selected different tape storage drive is selected from the second list comprising the plurality of idle tape storage drives, and wherein the selected different tape storage drive has an associated write efficiency metric that is largest among the plurality of idle tape storage drives, and wherein the associated write efficiency metric is used to calculate a predicted total media length that is required to store the entire set of data sets, and wherein the predicted total media length is less than a total tape media length of the current tape storage media cartridge minus a predetermined margin.

14. The system of claim 8, wherein the memory is configured to provide the processor with instructions which when executed cause the processor to:
   in response to determining that a different tape storage drive is to be utilized to complete writing of the entire set of data sets to the current tape storage media cartridge, use the different tape storage drive to complete writing of the entire set of data sets to the current tape storage media cartridge.

15. A system, comprising:
   a processor; and
   a memory coupled with the processor, wherein the memory is configured to provide the processor with instructions which when executed cause the processor to:
      determine one or more write efficiency metrics associated with a tape storage drive while the tape storage drive is operating on one or more tape storage media cartridges to write data sets to the one or more tape storage media cartridges, wherein one of the one or more write efficiency metrics comprises an overall write efficiency metric that is an overall measure of efficiency while writing data from a beginning of a tape storage media cartridge up to a certain data set on the tape storage media cartridge;
      predict whether the tape storage drive would be able to write an entire set of data sets to a current tape storage media cartridge based on the one or more write efficiency metrics; and
      determine whether a different tape storage drive is to be utilized to complete writing of the entire set of data sets to the current tape storage media cartridge based on the prediction.

16. The system of claim 15, wherein predicting whether the tape storage drive would be able to write an entire set of data sets to a current tape storage media cartridge based on the one or more write efficiency metrics further comprises:
   determining a predicted total tape media length that is required to store the entire set of data sets based on the one or more write efficiency metrics.

17. The system of claim 16, wherein predicting whether the tape storage drive would be able to write an entire set of data sets to a current tape storage media cartridge based on the one or more write efficiency metrics further comprises:
   determining whether the predicted total tape media length is less than a total tape media length of the current tape storage media cartridge minus a predetermined margin.

18. The system of claim 15, wherein the memory is configured to provide the processor with instructions which when executed cause the processor to:
   maintain two lists of tape storage drives, wherein a first list comprises a plurality of busy tape storage drives that are currently used for writing data, and wherein a second list comprises a plurality of idle tape storage drives that are not writing data but are either idling or reading data.

19. The system of claim 18, wherein the memory is configured to provide the processor with instructions which when executed cause the processor to:
   sort the two lists of tape storage drives based on a write efficiency metric.

20. The system of claim 15, wherein the memory is configured to provide the processor with instructions which when executed cause the processor to:
   in response to determining that a different tape storage drive is to be utilized to complete writing of the entire set of data sets to the current tape storage media cartridge, use the different tape storage drive to complete writing of the entire set of data sets to the current tape storage media cartridge.

* * * * *